United States Patent Office 3,128,291
Patented Apr. 7, 1964

3,128,291
NEW HEMIACETALS AND HEMIACETAL ESTERS OF THE ANDROSTANE SERIES AND A METHOD FOR THEIR PRODUCTION
Poul Borrevang, Copenhagen, Denmark, assignor to Lovens Kemiske Fabrik ved A. Kongsted, Ballerup, Denmark, a firm
No Drawing. Filed June 16, 1961, Ser. No. 117,497
Claims priority, application Great Britain June 23, 1960
7 Claims. (Cl. 260—397.4)

This invention relates to hitherto unknown derivatives of the androstane series, and to a method of making the same.

Specifically the invention relates to derivatives which are 3- or 17-hemiacetals, or 3,17-dihemiacetals of certain steroids of the androstane series, and to esters of the said hemiacetals or dihemiacetals.

The compounds of the invention are therapeutical useable steroid derivatives, which may be represented by the general Formulae I and II differing (as will be understood from the explanation following the formulae) with respect to the position of a double bond:

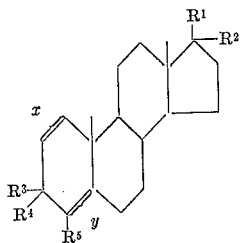

(I)

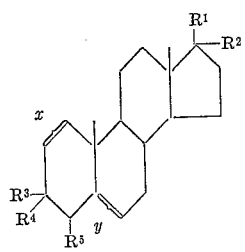

(II)

In these Formulae $R^1$ designates an atom or group selected from the class consisting of hydrogen, a lower saturated aliphatic group and a lower unsaturated aliphatic group, containing preferably not more than 3 carbon atoms, $R^2$ is selected from the class consisting of a β-hydroxy group, a radical capable of being transformed to a β-hydroxy group and a radical connected in the β-position to the steroid molecule and having the formula:

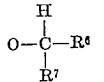

(III)

in which $R^6$ is an aliphatic radical which is unsubstituted or substituted with members of the group consisting of halogens, aromatic and heterocyclic groups, and $R^7$ is a free or esterified hydroxy group;

$R^3$ is selected from the class consisting of hydrogen, and, together with $R^4$, an oxygen atom, $R^4$ is selected from the class consisting of an α-hydroxy group, a radical capable of being transformed to an α-hydroxy group, a β-hydroxy group, a radical capable of being transformed, to a β-hydroxy group, and the radical of the general Formula III, in which $R^6$ and $R^7$ have the same meaning hereinbefore defined, provided that when $R^2$ is not the radical of the general Formula III, $R^4$ must be the said radical, $R^5$ is selected from the class consisting of hydrogen, halogen and a hydroxy group, $x$ and $y$ are selected from the class consisting of a single and a double bond, provided that in Formula I, when $R^1$ and $R^5$ are hydrogen, and $R^3$ and $R^4$ design together an oxygen atom, $x$ is a single bond and $y$ is a double bond, the hemiacetal group must not be a chloral hemiacetal group.

Consequently, testosterone-chloral-hemiacetal and its esters are without the scope of the present invention.

The latter compounds have been previously described, and it is known that they possess anabolic and androgenic properties similar to those of testosterone, but that they exhibit a greater potency than testosterone itself and its hitherto known esters.

According to tests made in connection with the present invention it has now been found that when the 3- or 17-hydroxy group or both the 3- and 17-hydroxy groups of certain steroids of the androstane series are replaced by hemiacetal groups or hemiacetal ester groups, the aldehyde component of which might be chloral or other aldehydes, the activity of the steroid component in question will be retained or improved, and when more than one activity is concerned, the ratio between such activities may change. Moreover it has been found that the hemiacetal esters of the invention are advantageous in that some of them can be used in the production of therapeuticals for particular purposes.

However, particular attention should be paid to the change in the ratio between the anabolic and androgenic activities of some steroids contained in certain of the hemiacetals and hemiacetal esters of the invention, the anabolic activity being promoted relative to the androgenic activity.

Accordingly such derivatives may be employed in the treatment of surgical patients in order to shorten the convalescence period without the occurrence of undesired secondary effects due to the androgenic activity of the steroid component contained in the derivative employed.

Thus, for instance, by hemiacetalization of testosterone with butyrchloral or phenoxyacetaldehyde it has been possible to change the ratio between the said activities as shown in Table I, in which column A illustrates the androgenic activity of testosterone-17-butyrchloral-hemiacetal, testosterone-17-phenoxyacetaldehyde-hemiacetal and testosterone-17-phenoxyacetaldehyde-hemiacetal acetate respectively compared to that of testosterone-17-propionate, column B illustrates the anabolic activity of the same substances compared similarly to that of testosterone-17-propionate, and column C illustrates the ratio between the activities in question.

TABLE I

| Substance | A Androgen activity | B Anabolic activity | C Ratio: anabolic/androgen |
|---|---|---|---|
| Testosterone-propionate | 100 | 100 | 1,0 |
| Testosterone-butyrchloral-hemiacetal | 71 | 95 | 1,34 |
| Testosterone-phenoxyacetaldehyde-hemiacetal | 10 | 33 | 3,3 |
| Testosterone-phenoxyacetaldehyde-hemiacetal acetate | 80 | 130 | 1,63 |

The androgenic and anabolic activities described in Table I were determined by weighing vesiculae seminalis+prostata and levator ani respectively from groups of dissectionized, castrated male rats, which have previously been treated with one subcutaneous injection of the steroid in question 10 days before they were killed. The figures in columns A and B of Table I express the percentage activities of the derivatives compared to those of testosterone-propionate.

On the other hand, a protracted androgenic effect exceeding that known from the use of testosterone-esters when administered in the form of a subcutaneous injection of an aqueous crystal suspension, can be obtained by substituting for instance testosterone-bromal-hemiacetal acetate for the testosterone ester in such preparations.

As an illustrative example of this effect may be mentioned that a single injection of an aqueous testosterone-bromal-hemiacetal acetate crystal suspension expands its activity for a period of time exceeding 8 weeks, after which period of time the average weight of prostata+vesiculae seminalis collected from 10 castrated male rats previously treated with the said preparation amounted to 94 mgr., indicating a favourable protracted androgenic effect, as the average weight of the said glands collected from a group of control animals, being treated with a corresponding amount of testosterone-isobutyrate, similarly in the form of a single injection of an aqueous crystal suspension, only amounted to 77 mgr.

Thus, in a particular embodiment of the invention, the new steroid derivatives contain as the steroid component the well known androstanes or androstenes possessing themselves a therapeutical activity, as for instance testosterone, 4-chloro- and 4-hydroxy-testosterone 1-dehydro-testosterone, 17α-methyl-testosterone, androstane-3-one-17-ol, and 17α-methyl-Δ⁵-androstene-3,17-diol and similar steroids of the androstane series.

The invention, however, includes in general the hemiacetals or hemiacetal esters according to the Formulae I and II given hereinbefore, being not limited by the particular steroid components mentioned above.

The invention furthermore aims at providing a method of producing the said derivatives, according to which a steroid compound of the androstane series, containing at least one free hydroxy group either in the 3- or in the 17-position or hydroxy groups in both the 3- and the 17-position, and which contains the other substituents and double bonds in the steriod ring system of the derivative intended to be produced, is reacted with an aliphatic aldehyde, which may contain as substituents one or more halogen atoms, aromatic groups including a phenoxy group, or heterocyclic groups, or with a reactive derivative of such an aldehyde, whereafter the hemiacetal or dihemiacetal thus formed is isolated and purified, or when esters are desired, the hemiacetal or dihemiacetal formed by the aforesaid reaction is further reacted with an acylating agent containing the acyl group corresponding to the acid with which the said hemiacetal or dihemiacetal is to be esterified.

The reaction can be carried out in diluted solution, for instance by dissolving the steroid in question in a suitable solvent and adding the aldehyde, or the aldehyde may itself be used as the solvent, whereafter the mixture is left standing at a suitable temperature for a period of time required to accomplish the desired reaction. If the temperature is about 20° C., the reaction may be completed within a few hours or by standing overnight.

As is well known, aldehydes and alcohols can be made to react under suitable conditions so as to produce acetals or hemiacetals in high yields, and many aldehydes may be used in the method of the present invention. It is furthermore known that by reaction with water some aldehydes are transformed to hydrates, this reaction being analogous to the formation of acetals or hemiacetals, so that aldehydes capable of forming hydrates usually are capable of easily forming acetals or hemiacetals.

However, the preferred aldehydes in the method of the invention are chloral, bromal, fluoral or other halogenated aldehydes as for instance butyrchloral, and aromatic or heterocyclic substituted aliphatic aldehydes, as for instance phenoxyacetaldehyde and pyridinealdehyde.

The aldehyde can be used as such, or in the form of a reactive derivative of the aldehyde in question, for which purpose the hydrates are particularly suitable. Thus for instance, chloral hydrate, fluoral hydrate or bromal hydrate may be substituted for chloral, fluoral and bromal respectively.

In the method of the invention the aldehyde may be added in equivalent amounts to the reactive hydroxy groups present in the steroid molecule, or, there may be added an excess of the aldehyde. In respect hereto it should be mentioned that if the steroid compound used as the starting material contains hydroxy groups both in the 3- and the 17-position, and if the reaction is performed in the presence of an excess of the aldehyde and for the period of time required to accomplish the desired degree of reaction, hemiacetalization can occur both in the the 3- and the 17-position of the steroid molecule.

Performing the reaction, the steroid used as starting material will commonly dissolve in the reaction mixture after shaking for a short time. During the reaction, the hemiacetal or dihemiacetal may precipitate, or it can be precipitated after the conclusion of the reaction by adding to the mixture a component reducing the solubility of the reaction product. The product thus formed may be recovered for instance by filtration, whereafter it can be further purified by recrystallization or it can be transformed to an ester by an acylating process performed in known manner.

In some cases the process of purification is facilitated by esterification of the free hydroxy groups contained in the hemiacetal groups before recrystallization, the esters being in many cases capable of crystallizing more easily than the corresponding free hemiacetals or dihemiacetals.

However, it should particularly be mentioned that although the free hemiacetals are rather stable compounds and can be used as such, they are preferably used in the form of their esters, which in the presence of water are more stable than the free hemiacetals themselves.

Furthermore, some esters possess properties useful for particular therapeutical purposes, the utilization of the physiological activity of a steroid compound depending in many cases on the form of administration used.

Thus, by esterification of the free hydroxy group of the hemiacetal group or groups, slightly water-soluble esters may be formed, having particularly favourable properties with regard to protracted effects, as mentioned hereinbefore.

On the other hand, by esterification of the free hydroxy groups of the hemiacetal group or groups with for instance amino acids or one of the carboxyl groups of succinic acid, esters are produced the salts of which with acids or bases respectively are readily soluble in water.

The preferred acid group as a constituent of such hemiacetal esters is for instance the formyl-, acetyl-, propionyl-, butyryl-, isobutyryl-, cyclopentylpropionyl-, phenylpropionyl-, enanthyl-, glycyl-, succinyl-, glutaryl-group and a similar group.

The invention will now be illustrated by the following examples.

*Example 1*

4-CHLORO-TESTOSTERONE-17-CHLORAL-HEMIACETAL 1.6 grs. of 4-chloro-testosterone were added to a solution of 1.0 gm. of anhydrous chloral in 15 mls. of dry benzene, and the mixture was boiled with reflux for 1 hour. After standing overnight at room temperature, a product crystallized from the solution by scratching the wall of the vessel with a spatula. This product was filtered off and washed with benzene. After drying at room temperature, 1.1 gms. of the desired substance were obtained. After recrystallization from benzene the substance had a melting point of 120–122° C. The ultraviolet spectrum showed a maximum at 255 mμ (in ethanol), $\epsilon=13,700$.

*Analysis.*—Calculated for $C_{21}H_{28}Cl_4O_3$, $C_6H_6$: C, 59.14%; H, 6.25%; Cl, 25.86%. Found: C, 59.28%; H, 6.30%; Cl. 25.86%.

Example 2

4-HYDROXY-TESTOSTERONE-17-CHLORAL-HEMIACETAL 1.5 grs. of 4-hydroxy-testosterone were dissolved in 5 mls. of anhydrous chloral. After standing for 45 minutes at room temperature, ether was added, and the solution was washed three times with water. After drying the etheral phase over $Na_2SO_4$, it was evaporated in vacuo on a water bath to a small volume. By adding of petrolether a substance crystallized. After filtering off and drying at room temperature, 1.0 gm. of the desired substance was obtained having a melting point of 153–154° C. The ultraviolet spectrum showed a maximum at 278 m$\mu$ (in ethanol), $\epsilon$=123,000.

Example 3

17α-METHYL-TESTOSTERONE-17-CHLORAL-HEMIACETAL 3.0 gms. of 17α-methyl-testosterone were dissolved at room temperature in 15 mls. of anhydrous chloral. After standing overnight the crystals precipitated were filtered off and washed with petrolether. The filter cake was dried at room temperature, whereby 1.4 gms. of the desired substance were obtained. By evaporation of the mother liquor to dryness in vacuo on a water bath and addition of acetone and petrolether further 0.1 gm. of the substance was isolated. After purification by dissolving the product in chloroform and precipitation by addition of petrolether the desired substance was obtained with a melting point of 170–174° C. The ultra-violet spectrum showed a maximum at 241 m$\mu$ (in ethanol), $\epsilon$=16,600.

*Analysis.*—Calculated: C, 58.74%; H, 6.95%; Cl, 23.64%. Found: C, 58.69%; H, 6.71%; Cl, 23.80%.

Example 4

17α-METHYL-TESTOSTERONE-CHLORAL-HEMIACETAL ACETATE 3.0 gms. of 17α-methyl-testosterone-chloral-hemiacetal prepared as described in Example 3 were dissolved in a mixture of 9 mls. of pyridine and 9 mls. of acetic anhydride, whereafter the mixture was left standing at room temperature for 16 hours. The reaction mixture was then evaporated to dryness in vacuo and the residue obtained was recrystallized from methanol, thereby yielding the desired substance with a melting point of 163–165° C. The ultra-violet spectrum showed a maximum at 240 m$\mu$, $\epsilon$=16,300.

*Analysis.*—Calculated: C, 58.60%; H, 6.76%; Cl, 21.63%. Found: C, 58.74%; H, 6.91%; Cl. 21.62%.

Example 5

ANDROSTANE-3-ONE-17-OL-17-CHLORAL HEMIACETAL

To 2.9 gms. of androstane-3-one-17-ol was added a solution of 1.7 gms. of anhydrous chloral in 30 mls. of dry benzene. After shaking the mixture for about 30 minutes, a clear solution was obtained, and presently a substance began to separate. After further standing for two hours the substance was filtered off and washed with a small quantity of benzene. After drying at room temperature, 2.1 gms. of the desired substance were obtained. By recrystallization from ethyl acetate a substance was obtained with a melting point of 187–189° C.

*Analysis.*—Calculated: C, 57.60%; H, 7.14%; Cl, 24.30%. Found: C, 57.53%; H, 7.11%; Cl, 24.15%.

Example 6

ANDROSTANE-3-ONE-17-OL-17-CHLORAL-HEMIACETAL ACETATE

Following the procedure described in Example 4, the androstane-3-one-17-ol-17-chloral-hemiacetal prepared in Example 5 was acetylated thereby yielding the desired compound with a melting point of 136–138° C.

*Analysis.*—Calculated: C, 57.56%; H, 6.93%; Cl, 22.17%. Found: C, 57.70%; H, 7.12%; Cl, 22.22%.

Example 7

17α-METHYL-Δ⁵-ANDROSTEN-3,17-DIOL-3-CHLORAL-HEMIACETAL

To 3.0 gms. of 17α-methyl-Δ⁵-androstene-3,17-diol was added a solution of 2.0 gms. of anhydrous chloral in 30 mls. of chloroform. After shaking for about 30 minutes, the partly solidified mixture was placed on a suction filter and washed with a small amount of petrolether. After drying at room temperature, 2.8 gms. of the desired substance were obtained having a melting point of 172–173° C.

*Analysis.*—Calculated: C, 58.48%; H, 7.36%; Cl, 23.54%. Found: C, 58.46%; H, 7.49%; Cl, 23.70%.

Example 8

TESTOSTERONE-17-PHENOXYACETALDEHYDE-HEMIACETAL

To 2.9 gms. of testosterone was added a solution of 1.7 gms. of phenoxyacetaldehyde in 10 mls. of dry benzene. After shaking the mixture for about 15 minutes, a clear solution was obtained, and after standing about for 1½ hours a solid substance separated out. After standing for further two hours the substance was filtered off. By washing with benzene and drying at room temperature, 1.5 gms. of the desired substance were obtained. By recrystallization from ethyl acetate the substance had a melting point of 145–146° C. The ultra-violet spectrum showed a maximum at 223 m$\mu$ and 241 m$\mu$ (in ethanol), $\epsilon$=15,600 and 17,500.

*Analysis.*—Calculated: C, 76.38%; H, 8.54%. Found: C, 76.46%; H, 8.58%.

Example 9

TESTOSTERONE-17-PHENOXYACETALDEHYDE-HEMIACETAL ACETATE 4.7 gms. of testosterone-17-phenoxyacetaldehyde-hemiacetal were dissolved in 40 mls. of dry pyridine and cooled to 0° C., whereafter 2.5 mls. of acetyl chloride were added dropwise. After standing at +2° C. for 3 hours, the mixture was poured into a mixture of ether and a solution of $Na_2CO_3$ while stirring vigorously. After stirring for 10 minutes the etheral phase was separated, washed with water two times, dried and evaporated in vacuo on a water bath. By adding of methanol the residue crystallized. The crystals were filtered off and dried at room temperature, thereby yielding 3.3 gms. of the desired substance. By recrystallization from methanol the substance had a melting point of 131–132° C. The ultra-violet spectrum showed a maximum at 241 m$\mu$ (in ethanol), $\epsilon$=17,500.

*Analysis.*—Calculated: C, 74.65%; H, 8.21%. Found: C, 74.81%; H, 8.32%.

Example 10

TESTOSTERONE-PHENOXYACETALDEHYDE-HEMIACETAL FORMATE

At a temperature of +20° C. 1.4 gms. of testosterone-phenoxyacetaldehyde-hemiacetal were suspended in 10 mls. of pyridine. While stirring was added a mixture of 22.5 mls. of acetic anhydride and 8.3 mls. of formic acid. The steroid compound did not dissolve in the mixture and the reaction mixture was stirred vigorously for 5 hours at a temperature of +2° C. Thereafter the solid compound suspended in the reaction mixture was filtered off, thereby yielding 1.2 gms. of the desired compound, which after recrystallization from dimethylformamide had a melting point of 210–212° C. The ultra-violet spectrum showed maximum at 241 m$\mu$, $\epsilon$=17,200.

*Analysis.*—Calculated: C, 74.30%; H, 8.02%. Found: C, 74.27%; H, 8.19%.

Example 11
1-DEHYDRO-TESTOSTERONE-17-CHLORAL-HEMIACETAL 2.9 gms. of 1-dehydro-testosterone were dissolved in 10 mls. of glacial acetic acid, and 1.7 gms. of anhydrous chloral dissolved in 5 mls. of glacial acetic acid were added. After standing for 1 hour at room temperature, a small amount of ether was added and by subsequently adding of petrolether to the solution an oily substance precipitated. After shaking and standing for a while, the homogeneous phase was removed by decanting. The oily residue was thereafter washed with petrolether, and the petrolether subsequently decanted off. This process was repeated once more. Finally, the oily residue was dissolved in acetone, and the solution was left standing at +2° C. until the substance crystallized. By filtering off and drying the filter cake, 1.0 gm. of the desired substance was obtained with a melting point of 165–167° C.

Example 12
1-DEHYDRO-TESTOSTERONE-17-CHLORAL-HEMIACETAL ACETATE 800 mgs. of the compound described in Example 11 were dissolved in a mixture of 3 mls. of acetic anhydride and 3 mls. of pyridine. Thereby the substance dissolved, and in the course of a few minutes the solution became partially solid. After standing for 1 hour the substance thus precipitated was filtered off. After drying, 600 mgs. of the desired substance were obtained having a melting point of 223–224° C. after recrystallization from acetone. The ultra-violet spectrum showed a maximum at 244 m$\mu$ (in ethanol), $\epsilon$=16,500.

*Analysis.*—Calculated: C, 58.05%; H, 6.14%; Cl, 22.36%. Found: C, 58.05%; H, 6.11%; Cl, 22.40%.

Example 13
TESTOSTERONE-17-(PYRIDINE-4-ALDEHYDE)-HEMIACETAL 3.0 gms. of testosterone were dissolved at about 50° C. in 5 mls. of pyridine-4-aldehyde. After standing at room temperature for about 17 hours crystals separated out. Thereafter ether was added and the substance was filtered off and washed with ether. After drying 2.9 gms. of the desired substance were obtained. By recrystallization from dimethylformamide, the substance had a melting point of 129–130° C. The ultra-violet spectrum showed a maximum at 241 m$\mu$ (in ethanol), $\epsilon$=18,100.

*Analysis.*—Calculated: C, 75.91%; H, 8.41%; N, 3.54%. Found: C, 75.80%; H, 8.45%; N, 3.51%.

Example 14
TESTOSTERONE-FLUORAL-HEMIACETAL 3.0 gms. of testosterone were dissolved in 25 mls. of chloroform and 1 ml. of anhydrous fluoral of a temperature of −80° C. was added. After standing for 3 hours at room temperature the mixture was washed three times with water and the chloroform phase was dried and evaporated to dryness in vacuo on a water bath. By addition of ethyl acetate the residue crystallized. The substance was filtered off, and after drying 1.8 gms. of the desired substance were obtained. After recrystallization from ethyl acetate the substance had a melting point of 156–160° C. The ultra-violet spectrum showed a maximum at 241 m$\mu$, $\epsilon$=17,600.

*Analysis.*—Calculated: C, 65.27%; H, 7.56%. Found: C, 65.32%, H, 7.69%.

Example 15
TESTOSTERONE-17-FLUORAL-HEMIACETAL ACETATE

To 1.8 gms. of the compound described in Example 14 was added a mixture of 5 mls. of dry pyridine and 5 mls. of acetic anhydride. After standing for about 17 hours at room temperature the mixture was evaporated in vacuo to a small volume on a steam bath. By addition of methanol the residue crystillized. The crystals were filtered off, washed with a small volume of methanol and dried at room temperature, thereby yielding 1.0 gm. of the desired substance. By recrystallization from methanol the substance had a melting point of 112–115° C. The ultra-violet spectrum showed a maximum at 240 m$\mu$ (in ethanol), $\epsilon$=17,200.

*Analysis.*—Calculated: C, 64.47%; H, 7.29%. Found: C, 64.38%; H, 7.21%.

Example 16
1-DEHYDRO-TESTOSTERONE-17-FLUORAL-HEMIACETAL

To a suspension of 1.0 gm. of 1-dehydro-testosterone in 5 mls. of dry benzene was added at room temperature 1 ml. of anhydrous fluoral of a temperature of −80° C. After shaking for a while a clear solution was formed, which was left standing for about 17 hours. After evaporation to a small volume in vacuo on a water bath, acetic acid was added to the residue, which thereby crystallized. After filtering off the crystals, washing the filter cake with a small quantity of cold ether and drying at room temperature, 220 mgs. of the desired substance were obtained having a melting point of 186–188° C.

Example 17
1-DEHYDRO-TESTOSTERONE-17-FLUORAL-HEMIACETAL

To 5.0 gms. of 1-dehydro-testosterone were added at room temperature 10 mls. of fluoral hydrate, and the mixture was stirred for 20 hours. Thereby a clear solution was formed, from which crystals began to separate out. These were filtered off, washed with a small quantity of cold ether and dried, thereby yielding 2.1 gms. of the desired substance with a melting point of 181–184° C. By recrystallization from a mixture of ethyl acetate and cyclohexane the melting point of the substance rose to 187–189° C. The ultraviolet spectrum showed a maximum at 244 m$\mu$ (in ethanol), $\epsilon$=17,000.

*Analysis.*—Calculated: C, 65.61%; H, 7.08%. Found: C, 65.55%; H, 7.17%.

Example 18
1-DEHYDRO-TESTOSTERONE-17-FLUORAL-HEMIACETAL ACETATE 1.0 gms. of the compound described in the Examples 16 and 17 was dissolved in a mixture of 2.5 mls. of acetic anhydride and 2.5 mls. of dry pyridine. After standing for about 17 hours at room temperature the solution was poured into icewater. The mixture was extracted with a solvent consisting of 100 mls. of ether and 20 mls. of methylene chloride, and the etheral phase subsequently washed with ice-cold 0.5 N $H_2SO_4$, thereafter with a saturated solution of $NaHCO_3$ and finally with water. The organic phase was dried over $Na_2SO_4$ and evaporated to dryness in vacuo on a water bath, and the solid residue was crystallized from cyklohexane, and after drying at room temperature the product obtained amounted to 564 mgs. having a melting point of 137° C. The ultraviolet spectrum showed a maximum at 243 m$\mu$ (in ethanol), $\epsilon$=16,700.

*Analysis.*—Calculated: C, 64.77%; H, 6.85%. Found: C, 64.89%; H, 6.83%.

Example 19
1-DEHYDRO-TESTOSTERONE-17-FLUORAL-HEMIACETAL-α-PHENOXYISOBUTYRATE 1.5 gms. of 1-dehydro-testosterone-17-fluoral-hemiacetal were dissolved in a mixture of 3 mls. of dry pyridine and 5 mls. of dry benzene. The solution was cooled in an ice-bath and a solution of 2.5 mls. of α-phenoxyisobutyric chloride in 5 mls. of dry benzene was added dropwise while stirring. After standing for 17 hours at room temperature 150 mls. of ether and 25 mls. of ethyl acetate were added, and after decanting from the residue, the solution was washed with 2×25 mls. of ice-cold 0.5 N $H_2SO_4$, 3×25mls. of ice-cold 0.5 N NaOH and twice with water. After drying over $Na_2SO_4$ the solution was evaporated in vacuo on a water bath to a syrupy residue. The residue was dissolved in acetone and chromatographed through a neutral $Al_2O_3$-column. After distilling off the acetone, the residue crystallized by addition of methanol. The substance was filtered off, washed with petrolether and dried in the air thereby yielding 364 mgs. of the desired substance of a melting point 130–131° C. The ultraviolet spectrum showed a maximum at 244 mμ (in ethanol), ε=16,700.

*Example 20*

TESTOSTERONE-17-FLUORAL-HEMIACETAL ISOBUTYRATE 725 mgs. of testosterone-17-fluoral-hemiacetal were dissolved in a mixture of 2.1 mls. of dry pyridine and 2.1 mls. of isobutyric anhydride. After standing for 17 hours at room temperataure, the solution was evaporated in vacuo on a steam bath to syrupy consistency. To the residue, which crystallized by standing, ice-cold petrolether was added and the residue was filtered off and washed with a small quantity of petrolether. By recrystallization from 70% aqueous methanol and drying at room temperature, 165 mgs. of the desired substance were obtained having a melting point of 114–116° C. The ultraviolet spectrum showed a maximum at 240 mμ (in ethanol), ε=16,300.

*Example 21*

17α-ETHINYL-TESTOSTERONE-17-CHLORAL-HEMIACETAL 2.0 gms. of 17α-ethinyl-testosterone were suspended into 10 mls. of anhydrous chloral and the mixture was heated until the steroid had dissolved. Thereafter the reaction mixture was left standing at room temperature for three days. Then, the mixture was evaporated in vacuo to dryness and the residue recrystallized from ethyl acetate, thereby yielding 1.8 gms. of the desired substance, which after a further recrystallization from acetone had a melting point of 210–212° C. The ultraviolet spectrum showed a maximum at 241 mμ, ε=17,100.

*Analysis.*—Calculated: C, 60.07%; H, 6.36%; Cl, 23.13%. Found: C, 60.20%; H, 6.38%; Cl, 23.02%.

*Example 22*

TESTOSTERONE-17-BROMAL-HEMIACETAL

To a mixture of 3.3 gms. of bromal and 10 mls. of dry benzene were added 2.9 gms. of testosterone while stirring and in the course of a few minutes, the steroid dissolved. After further stirring, a substance began to precipitate, which after 15 minutes time of reaction was filtered off. The filter cake was washed with a mixture of benzene/petrolether (1:1) and dried at room temperature, thereby yielding 2.2 gms. of the desired substance having a melting point of 118–122° C. After a further recrystallization from ethyl acetate the melting point rose to 124–126° C. The ultraviolet spectrum showed a maximum at 240 mμ, ε=18,000.

*Analysis.*—Calculated: C, 44.31%; H, 5.14%; Br 42.12%. Found: C, 44.29%; H, 5.05%; Br. 42.03%.

Following the procedure described in Example 4, the compound thus obtained was acetylated yielding testosterone-17-bromal-hemiacetal acetate with a melting point of 199–200° C.

*Analysis.*—Calculated: C, 45.19%; H, 5.11%; Br 39.23%. Found: C, 45.28%; H, 5.22%; Br 39.30%.

Following the procedure described in Example 4, but substituting α-phenylpropionic chloride for acetic anhydride, testosterone-17-bromal-hemiacetal was converted to the testosterone - 17 - bromal-hemiacetal-α-phenylpropionate having the melting point of 166–167° C.

*Analysis.*—Calculated: C, 51.37%; H, 5.32%; Br 34.19%. Found: C, 51.45%; H, 5.48%; Br 34.09%.

*Example 23*

TESTOSTERONE-17-BUTYRCHLORAL-HEMIACETAL

To a mixture of 2 gms. butyrchloral (2,2,3-trichlorobutanal) and 10 mls. of dry benzene were added 2.9 gms. of testosterone. After stirring for 15 minutes at room temperature, the steroid dissolved, and after further stirring for 2 hours, the reaction mixture became solid. The product formed was filtered off, washed with benzene and thereafter with petrolether. After drying the filtercake, the yeld amounted to 2.4 mgs. of the desired substance having a melting point of 169–170° C. The ultraviolet spectrum showed a maximum at 240 mμ, ε=17,500.

*Analysis.*—Calculated: C, 59.55%; H, 7.17%; Cl, 22.93%. Found: C. 59.70%; H, 7.33%; Cl, 22.75%.

Following the procedure described in Example 4, the substance thus obtained was converted to testosterone-17-butyrchloral-hemiacetal acetate, having a melting point of 158–161° C. and a maximum in the ultraviolet spectrum at 240 mμ, ε=16,600.

What is claimed is:

1. A compound selected from the group consisting of testosterone-17-phenoxyacetaldehyde-hemiacetal and its esters of the formula

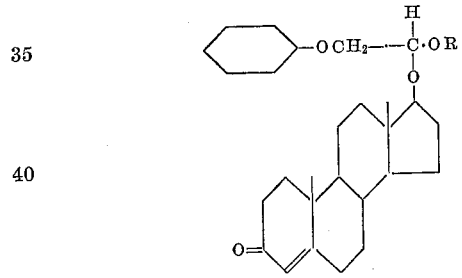

in which R is a radical selected from the group consisting of hydrogen-, formyl-, acetyl-, propionyl-, butyryl-, isobutyryl-, cyclopentylpropionyl-, phenylpropionyl-, enanthyl-, glycyl-, succinyl-, and glutaryl radicals.

2. The product of claim 1, in which the ester group is a formate group.

3. The product of claim 1, in which the ester group is an acetate group.

4. A method of producing testosterone derivatives having the formula

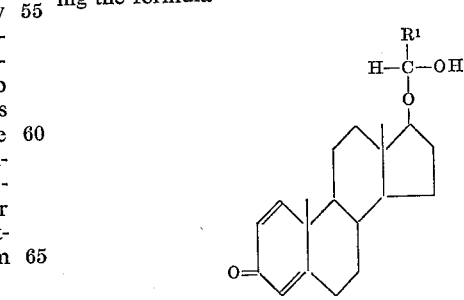

in which $R^1$ is an aliphatic radical containing 1–3 carbon atoms substituted by at least one member of the class consisting of the halogens and the phenoxy group, provided that when the aliphatic radical contains only one carbon atom the substituent is not chlorine, consisting in reacting testosterone with an aliphatic aldehyde, of the formula $R^1CHO$ in which $R^1$ has the meaning defined herein.

5. A method as claimed in claim 4 in which the aldehyde is used in the form of its hydrate.

6. A method of producing testosterone derivatives having the formula

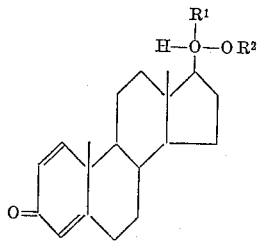

in which $R^1$ is an aliphatic radical containing 1–3 carbon atoms substituted by at least one member of the class consisting of the halogens and the phenoxy group, provided that when the aliphatic radical contains only one carbon atom the substituent is not chlorine, and in which $R^2$ is an esterified hydroxyl group, consisting in reacting testosterone with an aliphatic aldehyde, of the formula $R^1CHO$ in which $R^1$ has the meaning defined, and esterifying the testosterone hemiacetal formed.

7. A method as claimed in claim 6 in which the aldehyde is used in the form of its hydrate.

References Cited in the file of this patent

UNITED STATES PATENTS 2,933,514   Borrevang _____ Apr. 19, 1960